United States Patent [19]

Shimokawa et al.

[11] Patent Number: 4,973,953
[45] Date of Patent: Nov. 27, 1990

[54] DATA TRANSMISSION SYSTEM WITH IMPROVED FAULT

[75] Inventors: Yoshiyuki Shimokawa; Kimito Idemori, both of Tokyo, Japan

[73] Assignee: Kabushiki Kaisha Toshiba, Kanagawa, Japan

[21] Appl. No.: 421,315

[22] Filed: Oct. 13, 1989

Related U.S. Application Data

[63] Continuation of Ser. No. 173,457, Mar. 25, 1988, abandoned.

[30] Foreign Application Priority Data

Mar. 30, 1987 [JP] Japan .................. 62-74345

[51] Int. Cl.[5] .............................................. H04L 5/22
[52] U.S. Cl. ....................... 340/825.050; 340/825.50; 370/85.60; 370/85.12; 455/601
[58] Field of Search ...................... 340/825.05, 825.50; 370/85.60, 85.12, 85.15, 1, 4, 16, 16.10; 455/600, 601, 607; 371/8, 11

[56] References Cited

U.S. PATENT DOCUMENTS

| | | | |
|---|---|---|---|
| 3,652,798 | 3/1972 | McNeilly et al. | 370/88 |
| 4,190,821 | 2/1980 | Woodward | 370/16 |
| 4,416,008 | 11/1983 | Takahashi et al. | 370/88 |
| 4,501,021 | 2/1985 | Weiss | 370/88 |
| 4,538,264 | 8/1985 | Bahr et al. | 371/8 |
| 4,553,233 | 11/1985 | Debuysscher et al. | 370/88 |
| 4,572,270 | 7/1985 | Sweeton | 371/11 |
| 4,587,651 | 5/1986 | Nelson et al. | 370/85.12 |
| 4,663,748 | 5/1987 | Karbowiak et al. | 370/85.12 |
| 4,670,873 | 6/1987 | Cour et al. | 370/85.12 |

OTHER PUBLICATIONS

Japanese Utility Model Publication (Kokoku) No. 58-47111; Mori et al., Oct. 20, 1983.
Mori et al., "Autonomous Decentralized Loop Transmission System ADL and its Application," Local Area Network Symposium, pp. 107, 9/83.

*Primary Examiner*—Donald J. Yusko
*Assistant Examiner*—Eric O. Pudpud
*Attorney, Agent, or Firm*—Finnegan, Henderson, Farabow, Garrett, and Dunner

[57] ABSTRACT

A system of transmitting data and frame signals distinguishable from the data between a plurality of nodes linked in ring form. Each node comprising two transmitter circuits for simultaneously transmitting data and frame signals in opposite directions, respectively, two receiver circuits for receiving the data and the frame signals from opposite directions, respectively, a priority circuit for selecting the data first received from the two opposite directions, a frame circuit for detecting receipt of the frame signals and generating frame signals, and a control circuit for detecting data transmission faults and supervising data transmission of the system according to the location of the fault in the system, in response to the frame signals.

10 Claims, 5 Drawing Sheets

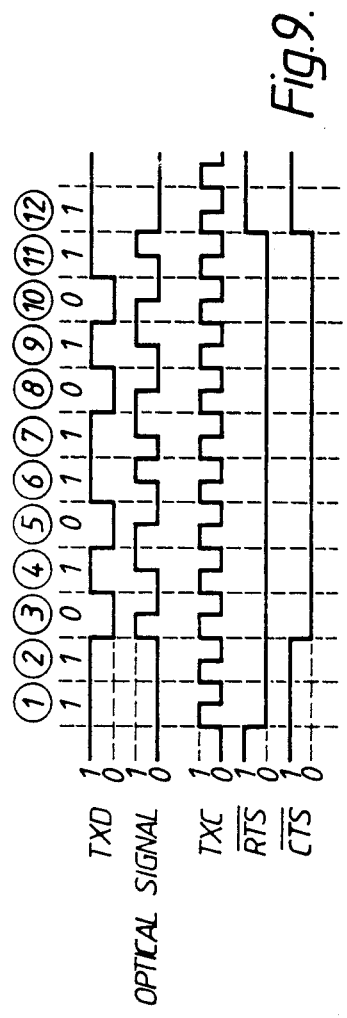
Fig.9.
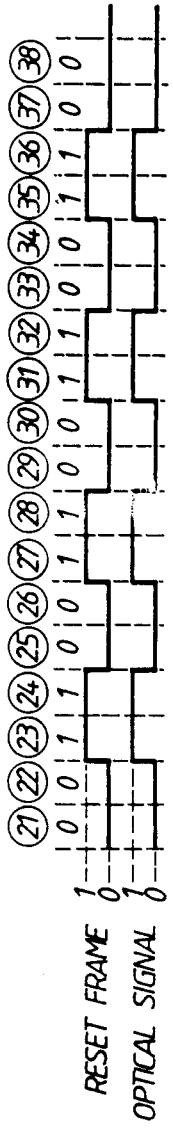
Fig.10(a)
Fig.10(b)
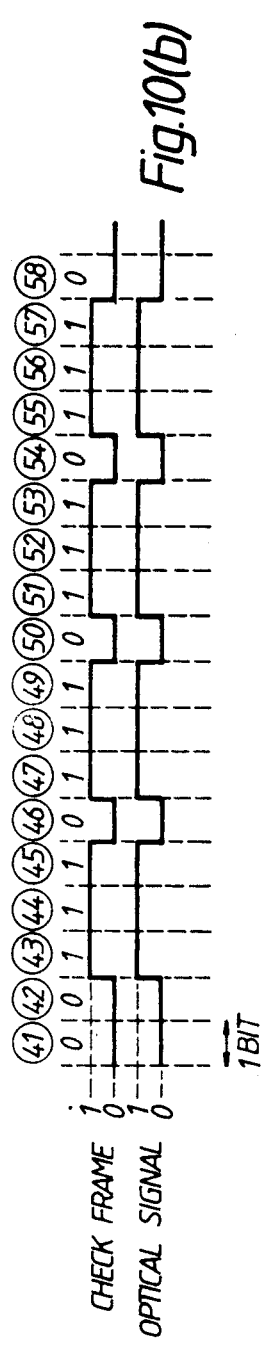

DATA TRANSMISSION SYSTEM WITH IMPROVED FAULT

This application is a continuation of application Ser. No. 07/173,457, filed Mar. 25, 1988, now abandoned.

BACKGROUND OF THE INVENTION

This invention relates to a data transmission system and more particularly to a system having improved reliability.

FIG. 1 shows a conventional bus type optical data transmission system. In FIG. 1, each of nodes 12-17 has two sets of optical transmitters and receivers, transmitting and receiving in opposite directions. A node which is not transmitting converts all the optical signals it has received into electrical signals. After that, it converts them back into optical signals and transmits these signals to the neighbouring nodes.

Two optical transmission lines, arranged in two sets for opposite direction of transmission, function like a single electrical transmission cable.

The following problems are associated with a system such as that shown in FIG. 1.

(1) When an intermediate node loses its transmission function because of some system fault, the nodes on its right and left become separated.

For example, if there is a fault in node 15 transmission between nodes 12 -14 and nodes 16 -17 becomes impossible.

(2) When there is a break at one place in an optical transmission line, or one optical transmitter or optical receiver is out of action, transmission is then possible only in one direction.

In this event, any fault between nodes should preferably be isolated immediately and transmission should be continued within the group of nodes thus isolated.

In a conventional system, isolation when a fault occurs is effected by a single special node known as the supervisor node, which oversees the whole system. When a fault occurs, this supervisor node temporarily suspends normal transmission, sends a frame to the next node as a check, checks its response, and then repeats this routine with the next node along the line.

This enables it to decide which node, or which line between which nodes, is not functioning properly. Having made this decision, the supervisor node isolates the fault by issuing a command to the relevant nodes, forbidding them to receive or transmit.

For example, if the supervisor node is the leftmost node 12, and a break occurs in optical transmission line 20, supervisor node 12 first checks the link with node 13, and then checks nodes 14 and 15. Nodes 15 and above do not respond, because they cannot receive signals from node 12 owing to the break in optical transmission line 20. The supervisor node therefore issues a command to node 14 forbidding it to receive from the right. The purpose of this is to prevent transmission between nodes 12-14 being disturbed by transmission from nodes 15 and up. The time of this checking is proportionate to the number of nodes involved, and isolation of the fault becomes a long process. Transmission cannot take place between nodes 15-17, which cannot be overseen by the supervisor node, since usually there is only one such supervisory node. A further supervisory node could be inserted between nodes 15 and 17, but if there are two supervisory nodes operating at the same time, data from nodes 15 -17 will be sent via optical transmission line 26 to nodes 12 -14, and the checking from the two sides will collide, making the operation more difficult. The key point is the difficulty, when supervision is by one node only, of continuing transmission within a plurality of groups when a fault has developed.

The following is a summary of the problems associated with the conventional optical data transmission system.

(1) When one intermediate node ceases to be able to transmit left and right, transmission between the remaining nodes becomes impossible.

(2) If transmission becomes impossible in either the left or the right direction, as when a fault occurs in a transmission line, transmitter or receiver of an intermediate node, and this fault is incompletely isolated, the nodes are divided into two separate groups, to the left and right of the point where the fault has occurred, and transmission is impossible between these groups.

SUMMARY OF THE INVENTION

It is an object of this invention to improve the reliability of a data transmission system.

Another object of the invention is to make it possible to execute a fault inspection of the system without deteriorating throughput of the system.

It is a further object of the invention to control initialization of the system.

Additional objects and advantages will be obvious from the description which follows, or may be learned by the practice of the invention.

The foregoing objects are achieved according to the present invention by providing a system for transmitting data and frame signals distinguishable from the data between a plurality of nodes linked in ring form.

Each node includes two transmitter circuits for simultaneously transmitting data and frame signals in opposite directions, respectively, two receiver circuits for receiving the data and the frame signals from opposite directions, respectively, a priority circuit for selecting the data first received from the two opposite directions, a frame circuit for detecting receipt of the frame signals and generating frame signals, and a control circuit for detecting data transmission faults and supervising data transmission of the system according to the location of the fault in the system, in response to the frame signals.

BRIEF DESCRIPTION OF THE DRAWINGS

FIG. 9 is a transmission chart time.

FIGs. 10(a) and 10(b) are time charts of a check frame and a reset frame,

DETAILED DESCRIPTION OF THE PREFERRED EMBODIMENTS

Figure 1:
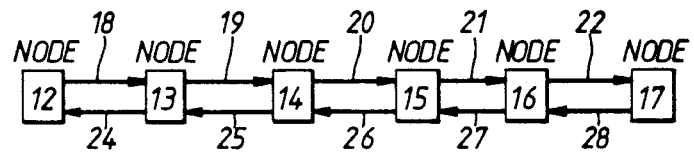
FIG. 1 is a schematic diagram illustrating a conventional data transmission system.

Referring now to the drawings, wherein like numerals designate identical or corresponding parts throughout the several views, various embodiments of the present invention will be described.

Figure 2:
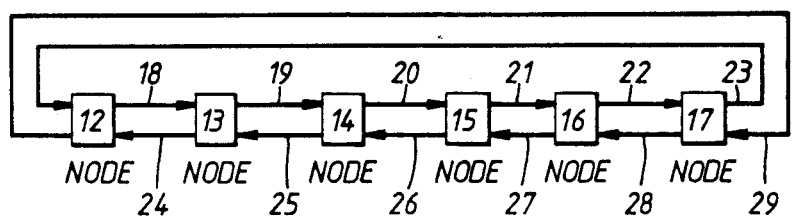
FIG. 2 is a schematic diagram of a data transmission system according to the invention.
Figure 3:
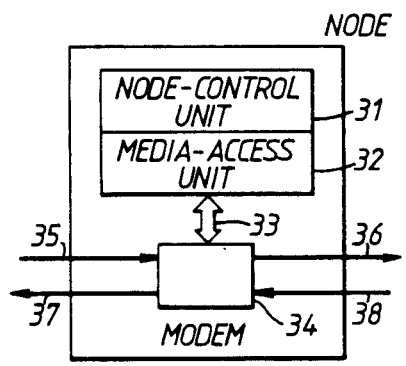
FIG. 3 is a block diagram showing the composition of a node according to the invention.

The transmission apparatus of the invention is linked together as shown in FIG. 2. All the nodes, are connected in the form of a ring, by two optical transmission lines of opposite transmission direction Each node is constructed as shown in FIG. 3. It consists of leftward optical transmission lines 37 and 38, rightward optical transmission lines 35 and 36, a modem 34, a media access control unit 32, a node control unit 31 and an interface 33. Except for optical transmission lines 35-38, this is fundamentally the same construction as that of a conventional electrical data transmission system. The internal construction of modem 34 changes, however, in the optical version of the system.

To put it another way, the transmission apparatus consists, apart from modem 34 and optical transmission lines 35-38, of nodes constructed so as to permit the use of an electrical data transmission system without modification.

Media access control unit 32 controls contention when several nodes send data to the transmission lines, converts parallel data to serial data, converts received serial data to parallel data, and detects errors in serial data. Node control unit 31 exercises overall control (transmission command to media access control unit 32, processing of data received, control of modem, etc.).

Interface 33 supplies serial data for transmission to modem 34, outputs a transmission clock pulse, receives permission to transmit, and inputs serial data received and a reception clock pulse.

Modem 34 modulates and sends transmission data received from interface 33, using the transmission clock pulse, demodulates data received, modulates it again and sends it, and also selects one of either data received and an extracted clock pulse and sends it to interface 33. In response to a request from interface 33 for transmission, it sends permission to transmit, the timing of the transmission being controlled by the control circuit of modem 34.

Modem 34 constitutes a distinctive feature of the invention, and its functions are explained in (i)-(v) below:

(i) When receiving, the modem 34 converts optical signals received from the optical transmission lines into electric signals in an optoelectric converter, then decodes them in a decoder circuit, and decides whether the signals received are normal. If a signal is normal, it is encoded in an encoder circuit, and sent, after conversion to an optical signal by the optoelectric converter, to an optical transmission line for transmission to a downstream-side node in the same direction. The above circuit has two sections, for the left and right directions. The earlier of normal signals received from both directions and decoded is selected by a priority circuit, and sent via interface 33 to media access control unit 32.

(ii) When transmitting, it encodes, by the previously-mentioned two encoder circuits, transmission data received from media access control unit 32, converts this data by two optoelectric converters into optical signals, and sends them to the two optical transmission lines.

In transmission, the modem plays the same role as a terminal node in the case of an electric cable. When a signal has been transmitted and has travelled completely round the ring, it is changed into an electrical signal by the optoelectric converter, and decoded by the decoder circuit. The modem then decides whether it is a normal signal. It is not repeated, as in reception. As the transmitting node is constantly changing, the position of the 'terminal node' alters dynamically, compared with a token passing bus system using electrical signals, in which the terminal node is fixed.

(iii) The time a signal that has been transmitted takes to travel completely around the ring, being repeated at each node, with addition of marginal time, is termed the 'slot time'. A timer built into the control circuit inside modem 34 measures this slot time. It makes two measurements, from the beginning of transmission and from the end of transmission. The transmitted data should travel around the ring and return within the slot time, and the first of these two measurements is used to detect any anomaly in transmission which would prevent the transmitted data returning. The second stipulates a transmission cut-off time, after which the node acts as a receiving node. Additionally, its repeat function is enabled, so if there is a request for retransmission, it can also transmit from this time onwards.

In other words, this determines the time between frames.

When receiving, the two measurements that are made at the time at which one side starts receiving. And the time from when the side selected by the priority circuit has finished receiving. When one side starts receiving, the other side, however late it may be, is bound to receive after the slot time, and the first of the two measurements is therefore used to detect any fault in reception.

The second measurement determines the time between frames. It decides the timepoint at which a receiving node can next transmit, and the time at which it can again receive.

(iv) When the detection of an anomaly referred to above is being carried out, it is necessary to specify where the fault actually is. In the invention, each node detects anomalies and takes decisions autonomously, and executes independently measures such as the prohibition of transmission or reception.

When an anomaly has been detected, the decision is effected by sending a check frame of short word length created by a check circuit to the neighbouring node on the side on which the anomaly was detected, the check circuit then deciding whether the neighbouring node has received the check frame normally. If it has, the check circuit prepares a check response frame of short word length and sends it back.

The content of the check frame and that of the check response frame may be the same, or they may be different. In the explanation which follows, they are assumed to be identical.

The check frame is transmitted and received in idle time between frames, equivalent to the slot time, in which data is not being transmitted.

No extra time is required, that is to say, for all these decisions to be made.

The check frame is unrelated to the transmission/-reception data from media access control unit 32. While the ordinary frames use a code including a clock pulse component, therefore, such as the Manchester code, for example, the check frame employs another code, such as an NRZ (Non-Return to Zero) code, enabling decisions to be made within modem 34.

In short, decisions are made in idle time by means of a code that does not appear in ordinary transmission, and this code is generated in modem 34, without going through media access control unit 32.

When an anomaly between its node and a neighbouring node is spotted by the check frame, the node which discovered the anomaly during reception prohibits the reception of ordinary frames on the side on which the anomaly was detected. The check frame and reset frame (to be described later), however, can still be transmitted or received.

When, during transmission, the anomaly detection referred to in (iii) above is carried out on one side only, the check procedure is the same as during reception. When it is carried out on both sides, the check frame is sent to the neighbouring nodes on either side, and the reception and transmission of ordinary frames is prohibited on the side where an anomaly is found. For example, reception from the right is prohibited, and transmission to the left. If there are anomalies on both sides, transmission and reception are prohibited over all directions. The check frame and reset frame, however, can be still transmitted or received.

It follows from the above that:
(1) When there is a fault in one of the transmission lines that run in the two opposite directions, the other transmission line can still be used effectively;
(2) When both the transmission lines that run in the two opposite directions develop faults at the same place, the ring is broken, and transmission is carried out along the resulting linear structures; and
(3) When both the transmission lines that run in the two opposite directions develop faults at different places, the result is a plurality of separate linear structures, and transmission takes place between those nodes which it is still possible.

(v) When a faulty node recovers, or a node that has stopped resumes operation, and when a break in an optical transmission line has been restored, so that the ring is connected again, a reset frame is used to inform all the nodes of these events.

A reset frame is issued, on the occasions mentioned in the preceding paragraph, by a node which was faulty but is now back in service, or a node which is resuming operation. All nodes receive this frame, and are thus informed of what has happened. Like the check frame, the reset frame uses a different code (an NRZ code, for example), distinguishing it from ordinary frames, so that is can be clearly understood even though it is sent as an interruption during transmission of a ordinary frame. The decision is made inside modem 34. Modem 34 contains a reset circuit, which prepares reset frames, discriminates such frames when they are received, and carries out repeats.

Figure 4:
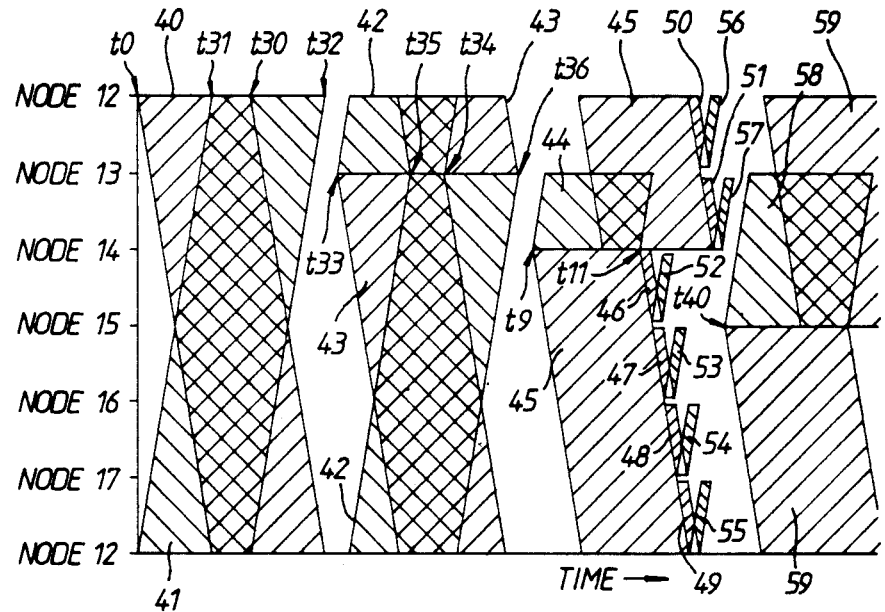
FIG. 4 is a time chart showing the transmission state of the nodes.
Figure 5:
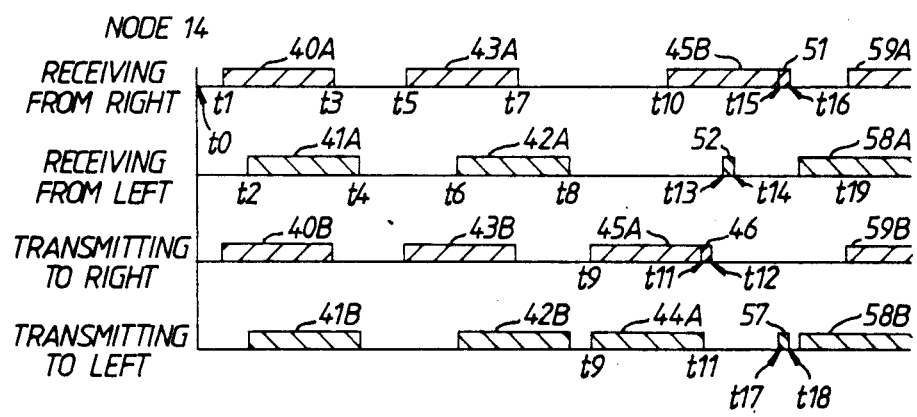
FIG. 5 is a time chart showing the transmission state with reference to node 14.

An explanation follows, referring to FIG. 2–4, of the way in which transmission is carried out. FIG. 4 shows the transmission state when the nodes of FIG. 2 transmit in the order Node 12, Node 13, Node 14 and Node 15 (vertical axis: nodes, horizontal axis: time). FIG. 5 is similar to FIG. 4, but focuses specifically on Node 14, showing its transmitting and receiving states in both the left and right directions.

There are two sets of optical transmission lines, rightward optical transmission lines 18–23 and leftward optical transmission lines 24–29.

In FIG. 4, the frames transmitted along the rightward optical transmission lines are 40, 43, 45, 46–51 and 59. Those passing along the leftward optical transmission lines are 41, 42, 44, 52–57 and 58. The former are indicated by hatching with the lines slanting up diagonally to the right, the latter by hatching with lines slanting up to the left.

First, Node 12 transmits frames 40 and 41 in both directions, from time t0 to time t30. Each node repeats the transmission of these frames, until finally they are received in Node 12 between time t31 and time t32.

Each node decodes the signals on receipt, and judges whether the signals are normal, and whether the frames are ordinary frames or check or reset frames. An ordinary frame is encoded and transmitted by the receiving station. Check frames and reset frames will be dealt with later.

In the case of Node 14, as shown in FIG. 5, frame 40A is received at time t1, and frame 41A at time t2. These frames are then transmitted (repeated) as frames 40B and 41B. The suffixes A and B are added because there is a time difference corresponding to at least 1 bit between reception and transmission.

If frame 40A is received at time t1, calculation of slot time Ts comes into play, and a decision is made whether frame 41A has been received by t1+Ts. Now if we assume that t2 is smaller than t1+Ts, the decision is made that operation is normal. Since frame 40A is the earlier of the two, it is selected by the priority circuit and frame 40A is supplied as reception data via interface 33 to media access control unit 32. When frame 40A finishes, at time t3, the time for calculating slot time Ts operates again, and transmission is carried out, provided it is authorized, after the slot time. A node that may transmit is, for example, one that has obtained a token. Once slot time has passed, after the end of a frame on one transmission line, the frame on the other transmission line must have finished, and transmission can therefore take place.

To apply this to Node 14, once frame 43A has finished, at time t7, and slot time Ts has passed, i.e., at time t9, the node can transmit frames 44A and 45A, provided it has obtained a token, from time t9 to time t11.

If we assume that when this operation takes place there has been a break in leftward optical transmission line 25 at node 13, then frame 44 will not appear on the leftward optical transmission line from node 13 onwards, frame 45 will be transmitted along the rightward optical transmission lines only, and will be received in node 14 from time t10 to time t15.

When the respective slot times have passed, after a transmitting node has started transmitting and a receiving node has started receiving from one direction, normally the transmitting node will start to receive from both directions, and the receiving node will start to receive from the other direction.

In the case in question, therefore, since all nodes have proved unable to receive in the leftward direction, check frames 46–51 are transmitted by the rightward optical transmission line, and a decision is made as to whether responses 52–57 have been returned from the neighbouring node. A node which has received the check frames decides that they are check frames, and sends back previously-mentioned responses 52–57.

If this is applied to Node 14, immediately following on frame 45A, i.e., between time t11 and t12, check frame 46 is sent rightwards to Node 15, and response 52 from Node 15 is received from the leftward transmission line between time t14 and time t15.

Check frame 51 from Node 13 is received immediately following frame 45B between time t15 and time t16, and response 57 is sent by the leftward transmission line between time t17 and time t18.

Time may be left between an ordinary frame and a check frame. In FIG. 4, it is assumed that the check frame is sent immediately after an ordinary frame.

As Node 13 cannot receive response 57 to check frame 51, the judgement is made that there is an anomaly between Nodes 13 and 14, and leftward reception is therefore stopped.

The transmission of check frames and the responses to them is carried out in the short idle times between ordinary frames. Each node has both a left and a right check circuit, with a checking function, so that all nodes can carry out checking simultaneously.

Next, Node 15 transmits, at time t40, sending frames 58 and 59.

If an anomaly is detected reception is stopped, as described above.

Figure 6:
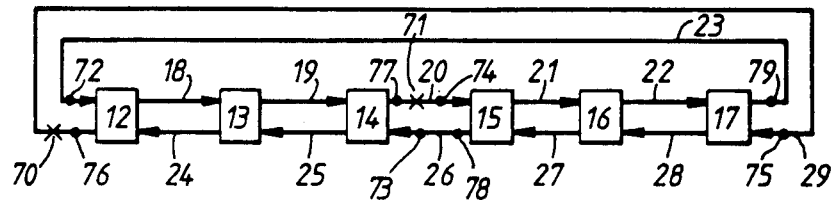
FIGS. 6 and 7 are diagrams illustrating states when faults occur in a data transmission system according to the invention.

FIG. 6 depicts the case where there are breaks in the optical transmission lines at two places. The breaks are marked in the drawing by x in each case. Heavy dots 72-75 and 76-79 indicate that the nodes nearest them have stopped receiving and transmitting respectively.

If the lines are disconnected at x 70 and 71, data from Nodes 15-17 can be transmitted to Nodes 12-14, but data from Nodes 12-14 cannot be transmitted to Nodes 15-17. Since normal transmission between Nodes 12-14 and 15-17 is not possible, having them operate as two smaller, independent groups is preferable to stopping them all. In this case, in order to prevent Nodes 12-14 from being disturbed by data transmitted from Nodes 15-17, a judgement is made from the check packet, as described in (iv) above, and measures are taken to prevent each group from receiving from, or transmitting to, the other. What happens is that an anomaly, namely that a receiving node is not receiving, is detected, and as the result of inspection by means of check frames, reception is prohibited at heavy dots 72, 73, 74 and 75. As the frames have not been received, though transmitted on both transmission lines, an inspection by check frame is made by the transmitting node, and measures are taken to prohibit either reception or transmission. In the case of Node 12, 76 indicates prohibition of transmission, and 72 prohibition of reception. Similarly, for Nodes 14, 15 and 17, 73 and 77, 74 and 78, and 75 and 79 constitute the respective prohibitions. Two smaller independent groups, consisting of Nodes 12-14 and Nodes 15-17, are formed by this means.

Figure 7:
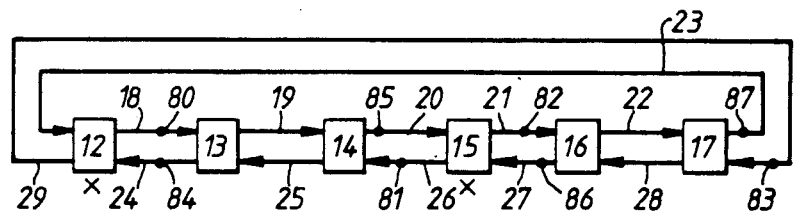

FIG. 7 depicts the case where Nodes 12 and 15 are not functioning at all, either because the power is not connected, or because of faults.

Heavy dots 80-83 indicate that the nodes nearest them have stopped receiving, and heavy dots 84-87 that the nodes nearest them have stopped transmitting. As in FIG. 6, transmitting and receiving stop on the side where the fault has occurred. In the case of Node 13, 80 and 84 indicate that transmitting and receiving have stopped on the Node 12 side: in that of Node 14, 81 and 85 indicate that they have stopped on the Node 15 side: in that of Node 16, 82 and 86 indicate that they have stopped on the Node 15 side: while in that of Node 17, 83 and 87 indicate that they have stopped on the Node 12 side. The effect of this is that the nodes are separated into two groups. Nodes 13 and 14 and Nodes 16 and 17.

When Node 15 is restored, all transmitting and receiving on the Node 15 sides of Nodes 14 and 16 is prohibited. Node 15 then transmits to both sides a reset frame. This reset frame is received, and repeated even by nodes which have been 'prohibited from receiving'. It can be distinguished even when it is mixed with ordinary data, and can therefore be sent during the transmission of such ordinary data. the reset frame is transmitted to all the nodes except node 12, which is faulty or without power. On receipt of the reset frame, each node can transmit or receive, even those which were till then subject to a prohibition on transmitting or receiving being initialized thereby, and the connections between the nodes are reinstated. Thus Nodes 13-17 are made into a single entity again, the two groups becoming one.

Similarly, when Node 12 is restored it sends a reset frame, the connections are reinstated, and all the nodes form a single entity again.

Figure 8:
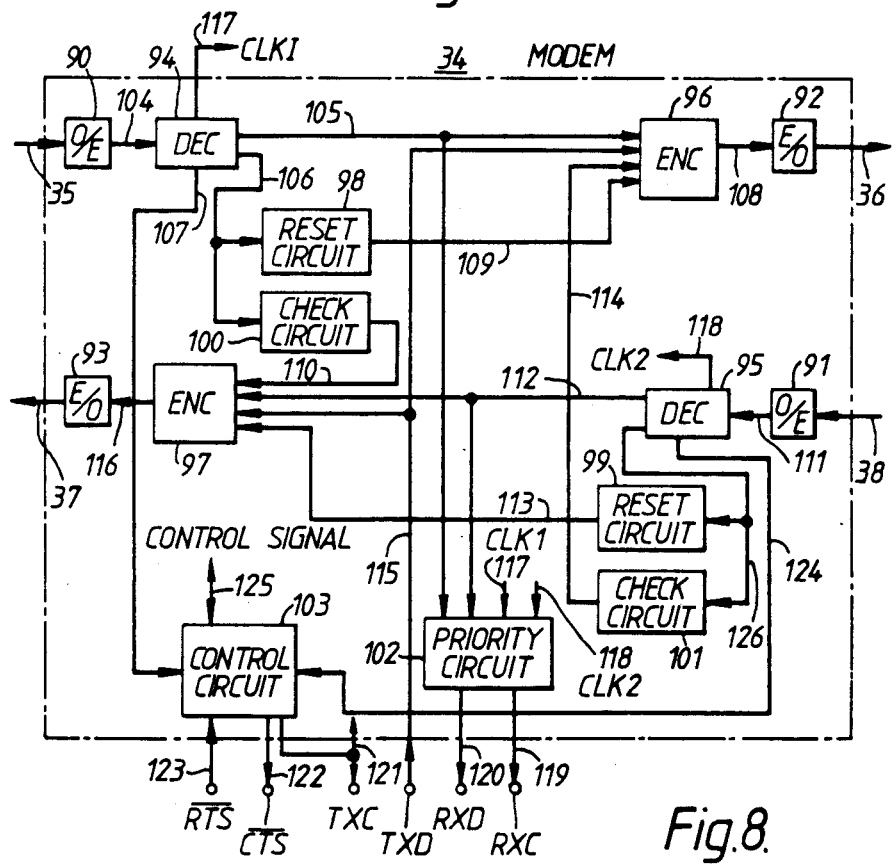
FIG. 8 is a block diagram illustrating an embodiment of a modem in a node of the invention.

In FIG. 8, the modem of this embodiment is composed of optoelectric converters 90 and 91, which convert light received from optical transmission lines 35 and 38 into electrical signals; electrooptic converters 92 and 93, which, conversely, convert electrical signals to light, and send them to optical transmission lines 36 and 37; demodulators 94 and 95, which demodulate signals received on line 111; a priority circuit 102 which selects whichever is the earliest, the leftward or the rightward, of the two sets of demodulated received data or two extracted received clock pulses 117 and 118; modulators 96 and 97 which, in addition to preparing modulated transmission data from transmission data (TXD) 115, and transmission clock pulse (TXC) 121, also modulate received data for retransmission; reset circuits 98 and 99 which decide, from signals displaying an NRZ code output from demodulators 94 and 95 on signal lines 106 and 126, and from NRZ data signals, whether this is a reset frame, and if it is, transmit it by inputting it via signal lines 109 and 113 into modulators 96 and 97, and if there is a further request for transmission of a reset frame, send a reset frame; check circuits 100 and 101, which input signal lines 106 and 126, decide if a check frame is received, and if it is, transmit a response via signal lines 110 and 114, and also send a check frame when they themselves have detected a fault; and a control circuit 103, exercising overall control of the modem, which receives transmission request (RTS) 123, outputs permission to transmit (CTS) 122, operates a built-in timer for measuring slot time, by means of signals received via signal lines 107 and 124 from demodulators 94 and 95 and indicating 'in course of receiving' or 'in course of transmitting', controls reception and transmission, and emits control signals 125 to the other parts of the modem.

In more detail, control circuit 103 sends commands authorizing or prohibiting transmission, and commands to repeat or not to repeat received data, to modulators 96 and 97. It issues to demodulators 94 and 95 commands authorizing or prohibiting reception, and to reset circuits 98 and 99, commands to transmit reset frames, while conversely receiving reset frame reception signals. It detects anomalies by means of the built-in timer for measuring slot time, and if an anomaly is actually found, it responds to the anomalous state by issuing to check circuits 100 and 101 a command to transmit a check frame, a signal indicating whether the response to the check frame is normal being passed back to the control circuit. It also prepares transmission clock pulse (TXC) 121.

Control circuit 103 is connected to node control unit 31 (this connection is not shown in FIG. 8). It requests node control unit 31 to transmit a reset frame, and reports receipt of a reset frame to node control unit 31.

Figure 11:
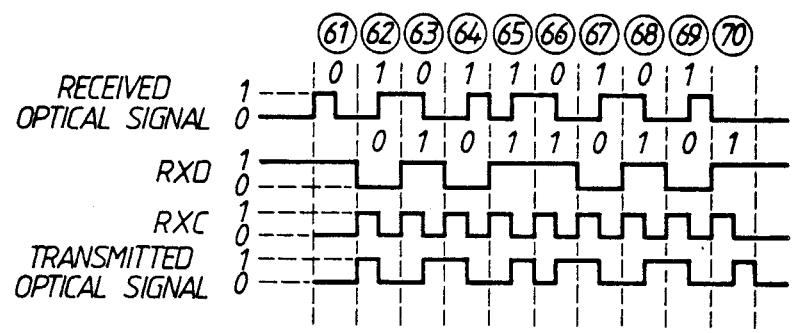
FIG. 11 is a reception time chart.

A detailed explanation follows of the operation referring to a number of time charts FIG. 9 is a transmission time chart, FIG. 10(a) reset frame time chart, FIG. 10(b), check frame time chart, and FIG. 11, a reception time chart.

As shown in FIG. 9, when, in the case of transmission, a request for transmission (RTS) 123 becomes active, control circuit 103, after the passage of slot time from the completion of transmission or reception, authorizes transmission by activating transmission authorization CTS 122. The figures (1)–(12) in FIG. 9 indicate the time for each one bit. As RTS becomes active at the beginning of (1), and CTS at the beginning of (3), transmission data (TXD) 115 is synchronized by transmission clock pulse (TXC) 121, via interface 33, converted to Manchester code by modulators (ENC) 96 and 97, output to signal lines 108 and 116, and converted to optical signals by electrooptic converters 92 and 93. In each time chart, the optical signal "1" indicates that the light is ON and "0" that it is OFF. The transmission data from (3) to (1) are modulated as shown by the light signal of FIG. 9, then output to optical transmission lines 36 and 37.

When transmission request RTS 123 becomes inactive, at (12), transmission authorization CTS 122 is rendered inactive, and transmission is stopped.

FIG. 11 shows the case when a receiving node receives. It receives optical signals repeated by a receiving node, or optical signals transmitted by a transmitting node. (61)–(69) correspond to (3)–(11) in FIG. 9. The optical signals being received are input from optical transmission lines 35 and 38, and converted into electrical signals by optoelectric converters 90 and 91, after which they enter, via signal lines 104 and 111, demodulators 94 and 95. Since with the Manchester code polarity is inverted at a timepoint corresponding to 50% of one bit, the polarity of a signal is remembered at the points when it is 25% and 75%, and a signal which changes from 1 to 0 is taken as "0", while one which changes from 0 to 1 is taken as "1". A signal which does not change at the 50% point is an NRZ signal. The signal received at (61) is remembered, as stated previously. and converted at (62) from Manchester code to an NRZ signal. This is the RXD in FIG. 11. What happens is that with a lag of one bit it is converted at (62) into an NRZ signal, and sent via signal lines 105 and 112 to priority circuit 102, where it is selected to become RXD. An NRZ signal on signal lines 105 and 112, on the other hand, is converted back to Manchester code by modulators 96 and 97, output to signal lines 108 and 106, converted to light by electrooptic converters 92 and 93, and sent to optical transmission lines 36 and 37.

This transmission signal is shown in FIG. 11.

FIG. 10(a) shows a reset frame. A reset frame repeats 1100 four times. To distinguish it from other frames, the first two bits are made "0".

When a reset frame is to be sent, node control unit 31 issues a command to control circuit 103, the reset frame shown in FIG. 10(a) is sent from reset circuits 98 and 99 to signal lines 109 and 113, and transmitted in that form, unmodulated by modulators 96 and 97.

When a reset frame is received, a signal indicating that it is an NRZ code, and the NRZ data signal, are input by demodulators 94 and 95 from signal lines 106 and 126, the decision as to whether it is a reset frame or not is made, according to whether or not it consists of the code 1100, and if it is a reset frame, it is repeated on signal lines 109 and 113, in the same way as in the case of the transmission described above. As the decision is made on the basis of four bits, there is a four-bit lag in the repeat transmission.

FIG 10(b) shows a check frame. A check frame repeats 1110 four times. To distinguish it from other frames, "0" signals are sent for the first two bits. When a check frame is to be sent, control circuit 103 makes the decision, as previously described, and issues a 'send check frame' command to check circuits 100 and 101. The check frame shown in FIG. 10(b) is then sent from check circuits 100 and 101 to signal lines 110 and 114, and transmitted in that form, unmodulated by modulators 96 and 97. When the check frame is transmitted, monitoring takes place to see whether a response is received from the neighbouring node within a given time. When a response to the check frame is received from the neighbouring node, a signal indicating that it is NRZ code, and an NRZ data signal, are output from demodulators 94 and 95 to signal lines 106 and 126, and the decision is made, by checking on the code, whether it is a response to the check frame. The response may have a different code from the check frame. In this explanation of an embodiment, partly in order to simplify the hardware, and partly because it is out of the question for a transmitted check frame and a response to a check frame to be received at the same time, both have been assumed to consist of the same code. The decision is therefore made as to whether it is a 1110 code, and the result of the decision is reported to control circuit 104. Control circuit 103 judges whether there has been a correct response to the check frame within a given time, and if there is any anomaly, prohibits transmission or reception as appropriate, in the manner described earlier. A control signal 125 from control circuit 103 conveys a command to demodulators 94 and 95, and to modulators 96 and 97, prohibiting reception or transmission. The node which receives the check frame and sends back a response operates in virtually the same manner. When it receives the check frame, it operates in exactly the same way from demodulators 94 and 95 until the decision is made in check circuits 100 and 101. If the code is that of a check frame, it s response is sent via modulators 96 and 97, in exactly the same way as the check frame, with a four-bit leg.

In this explanation, 1110 has been used for the check frame, but another simple code, such as 1010, or any other code, will serve.

Figure 12:
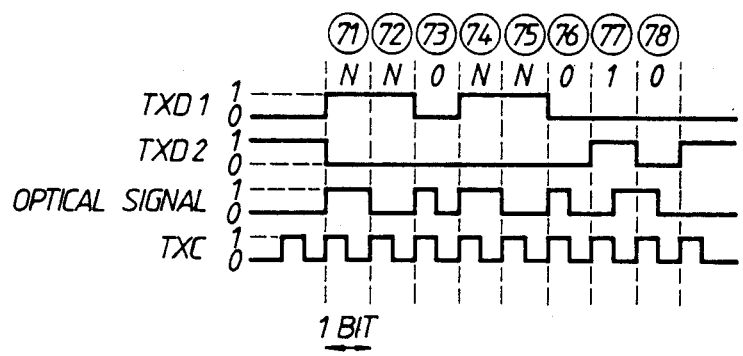
FIG. 12 is a time chart obtained when IEEE standard 802.4 is adopted.

For the frames, which are governed by IEEE 802.4, the three values: "N" (Non data), "1" are employed, as shown in FIG. 12. In the case of "N", a special rule applies that there should be two in succession.

As transmission and reception data are both three-value data, TXD and RXD in FIG. 8 are made up in each case of two bits. In FIG. 12 TXD is divided into TXD1 and TXD2. "0" and "1" are Manchester codes, but the two "NN" bits constitute a code which is changed in that they are distinct from the bits "10". This is shown at (71) (72) (74) (75) in FIG. 12. An illustration of the fact that the "NN" are not Manchester codes, and can be distinguished from the check and reset frames previously described in that if the transmission and reception data of FIG. 8 were changed to 3-value form, the same effect as in the embodiment described earlier could be obtained with IEEE 802.4.

The invention has the merit that the optical version can be obtained by changing only modem 34, downstream from interface 33, so that the change can be easily made.

It goes without saying, moreover, that if electrooptic and optoelectric converters for both directions are used for one optical transmission line, then only one optical transmission line need be used.

What is claimed is:

1. A system for transmitting and receiving information to and from each of a plurality of spaced nodes, comprising:
    a first optical communication line connecting each of the nodes to an adjacent node in a ring for transmitting and receiving information to and from adjacent nodes in a first direction; and
    a second optical communication line connecting each of the nodes to an adjacent node in a ring for transmitting and receiving information to and from adjacent nodes in a second direction opposite the first direction,
    each of the nodes including:
    first and second transmitter means for transmitting information over the respective first and second optical communication lines in a corresponding one of the first and second opposite directions,
    first and second receiver means for receiving information over the first and second optical communication lines in a corresponding one of the first and second opposite directions,
    priority circuit means responsive to the time of receipt of information containing data by each of the first and second receiver means for transmitting the data contained in the earlier received information to an external device connected to a corresponding node,
    first control means responsive to the first and second receiver means for determining abnormality of the received information,
    frame circuit means for transmitting a frame check signal to an adjacent node in one of the first and second directions corresponding to the received information in response to the determination of the abnormality of the received information, and
    second control means responsive to a frame check signal received from the abnormal adjacent node for inhibiting the transmission of information in the direction from which the frame check signal is received at times when the frame check signal indicates abnormality.

2. The system of claim 11, wherein the first and second optical communication lines are optical transmission lines carrying optical data, and each of the first and second transmitter means further includes electrooptic converter means for converting electrical signals to optical data, and modulator means for modulating the converted optical data for transmission, and each of the first and second receiver means includes optoelectric converter means for converting received optical data to electrical signals, and demodulating means for demodulating the converted electrical signals for signal processing.

3. The system of claim 1, wherein the first control means includes timer means responsive to each of the first and second receiver means for measuring elapsed time between the time when information is transmitted from one of the plurality of nodes over a corresponding one of the first and second optical communication lines and the time when said information is received by said one of the plurality of nodes, for determining the normality or abnormality of the received information.

4. The system of claim 1, wherein the frame circuit means includes check frame means for detecting whether the frame check signal includes a check frame, and generating in response to the detection of the check frame a response check frame for adjacent nodes for identifying the location of at least one abnormal node, and reset frame means for detecting whether the frame check signal includes a reset frame and generating in response to the detection of the reset frame a response reset frame for adjacent nodes for restarting the transmission of information.

5. The system of claim 1, wherein the first and second control means are combined to constitute one control means.

6. A method for transmitting and receiving information to and from each of a plurality of spaced nodes, comprising the steps of:
    connecting each node to an adjacent node in a ring forming a first optical communication line for transmitting and receiving information to and from adjacent nodes in a first direction;
    connecting each node to an adjacent node in a ring forming a second optical communication line for transmitting and receiving to and from adjacent nodes in a second direction opposite the first direction;
    transmitting information from each node over the respective optical communication lines in a corresponding one of the first and second directions;
    receiving information over the first and second optical communication lines in a corresponding one of the first and second directions;
    transmitting data contained in earlier received information to an external device connected to a corresponding node in response to the time of receipt of information containing the data by each of the first and second receiver means;
    determining the abnormality of the received information;
    transmitting a frame check signal in one of the first and second directions corresponding to the received information to an adjacent node in response to the determination of the abnormality of the received information; and
    inhibiting the transmission of information in the direction from which a frame check signal is received from the abnormal adjacent node at times when the frame check signal indicates abnormality.

7. The method of claim 6, wherein the transmitted and received information is optical data.

8. The method of claim 6, wherein the step of determining the normality of abnormality includes the substeps of measuring elapsed time between the time when information is transmitted from one of the plurality of nodes over a corresponding one of the first and second optical communication lines and the time said information is received by said one of the plurality of nodes, and comparing said elapsed time with a predetermined time value.

9. The method of claim 6, wherein the step of transmitting a frame check signal includes the substep of transmitting the frame check signal during idle time between data frames contained in the transmitted information.

10. The method of claim 6, wherein the step of inhibiting the transmission of information includes the substep of transmitting a check frame corresponding to the location of at least one abnormal node, and transmitting a reset frame for restarting the transmission of information when the abnormality is corrected.

* * * * *

UNITED STATES PATENT AND TRADEMARK OFFICE
CERTIFICATE OF CORRECTION

PATENT NO. : 4,973,953

DATED : November 27, 1990

INVENTOR(S) : Yoshiyuki Shimokawa et al.

It is certified that error appears in the above-identified patent and that said Letters Patent is hereby corrected as shown below:

On the title page, [54] after "FAULT" insert --DETECTION--.

Column 1, line 3, after "FAULT" insert --DETECTION--.

Column 11, claim 2, line 53, change "11" to --1--.

Column 12, claim 8, line 58, change "of" to --or--.

Signed and Sealed this

Thirtieth Day of March, 1993

Attest:

STEPHEN G. KUNIN

*Attesting Officer*  *Acting Commissioner of Patents and Trademarks*